United States Patent [19]
Ostrowski et al.

[11] 3,784,154
[45] Jan. 8, 1974

[54] WATER VALVE DIAPHRAGM

[75] Inventors: Edwin A. Ostrowski, Mount Prospect; Charles A. De Lew, Des Plaines, both of Ill.

[73] Assignee: Controls Company of America, Melrose Park, Ill.

[22] Filed: Oct. 12, 1970

[21] Appl. No.: 79,975

[52] U.S. Cl. .................... 251/30, 251/38, 251/45
[51] Int. Cl. .................... F16k 31/06, F16k 31/385
[58] Field of Search .................... 251/30, 38, 45

[56] References Cited
UNITED STATES PATENTS

| | | | |
|---|---|---|---|
| 3,630,482 | 12/1971 | Beller | 251/30 |
| 3,593,956 | 7/1971 | McCarty, Jr. | 251/30 |
| 3,593,957 | 7/1971 | Dolter | 251/30 |
| 2,644,476 | 7/1953 | Smith | 251/38 X |
| 2,574,488 | 11/1951 | Langdon | 251/38 X |
| 3,544,062 | 12/1970 | Murray | 251/30 X |
| 3,476,146 | 11/1969 | Dolter | 251/30 X |
| 2,994,505 | 8/1961 | Brakebill | 251/30 X |
| 3,512,749 | 5/1970 | Noakes et al. | 251/30 |

*Primary Examiner*—Arnold Rosenthal
*Attorney*—Bayard H. Michael

[57] ABSTRACT

The rigid, plastic insert molded into the diaphragm has a raised seat against which the soft tip, solenoid plunger seats with no need for critical registry, thus allowing greater clearance between the plunger and guide. The insert includes a depending boss which co-operates with the outlet to throttle flow during closure to reduce water hammer. The necessary bleed hole is in the insert for greater precision and uniformity of operation. The diaphragm material is molded to include a spacer preventing seating the bleed hole against the cup-like portion of the guide with consequent inability to close.

5 Claims, 2 Drawing Figures

PATENTED JAN 8 1974   3,784,154

Inventors
Edwin A. Ostrowski
By Charles A. deLew
Bayard H. Michael
Attorney

WATER VALVE DIAPHRAGM

CROSS-REFERENCES TO RELATED APPLICATIONS

The plastic plunger guide and associated structure is claimed in Beller application Ser. No. 885,907, now U.S. Pat. No. 3,630,482.

BACKGROUND OF INVENTION

1. Field of Invention

Solenoid-operated water valves are used widely in the appliance industry and customarily have a plunger which is actuated by the coil to open an orifice in the diaphragm to allow the water above the diaphragm to flow to the outlet faster than the flow can be replaced by flow through small bleed holes in the diaphragm. This, then, allows the inlet pressure acting over the annular portion of the diaphragm to lift the diaphragm and open the outlet. While the valve is open, the inlet pressure acts over the entire diaphragm and when the coil is de-energized, the plunger, no longer being affected by magnetic field, is thrust toward the extended diaphragm by virtue of the spring force, closing off the center orifice of the diaphragm. Flow is not now allowed to leave from the top side through the center orifice, thus pressure builds up and overcomes force on the underside and the diaphragm seats on the body seat shutting off flow through the outlet. Once closed, the inlet pressure force acting on the top diaphragm area greatly exceeds the inlet pressure force acting on the annular area below the diaphragm and the valve remains closed.

2. Description of the Prior Art

The relationship of the bleed hole size to the center orifice size is somewhat critical in obtaining proper performance. In the prior art it was necessary to provide a plurality of bleed holes to obtain the necessary area without having any one bleed hole too large. The inlet pressure acting under the diaphragm tends to balloon or stretch the inlet holes and over a period of time could greatly distort the operation of the water valve. Furthermore, the holes had to be kept small to reduce chances of various contaminants getting to the space above the diaphragm where they could bind the plunger in the energized position and prevent closure with consequent flooding of the appliance. This made plugging the holes a problem so the holes were located in the convolution of the diaphragm in the hope the flexing would keep the holes open.

SUMMARY OF INVENTION

The use of the rigid, plastic insert molded into the diaphragm, as described in the Abstract, makes it possible to employ a raised conical seat so that the plunger tip can be a flat, resilient face and eliminate the need for registry of a tip with an orifice as in the past. This, then, allows increased clearance between the plunger and the plunger guide tube so that there is less likelihood of contaminants binding the plunger in the open position. The plastic insert also permits placing the bleed hole in the insert itself rather than in the convolution of the diaphragm. This hole now can be of the requisite size instead of resorting to a plurality of small holes which could become plugged or distort with age. Therefore, the performance over the life of the valve is markedly improved. The same plastic insert can be provided with the depending cylindrical boss which cooperates with the outlet to throttle the flow as the valve closes and reduce water-hammer effect. Again, in the past there have been designs employing such throttling bosses but these required metallic inserts or metal-backed rubber tips to achieve the desired result without binding. The plastic material here is glass-filled Nylon which is dimensionally stable after long exposure to water and does not give any problems with respect to binding. Furthermore, the insert reduces the number of piece parts necessary to obtain the desired result.

As a result of these improvements, the valve has a longer service life with better performance throughout that life. Any possibility of the valve hanging up in the open position is virtually eliminated.

DESCRIPTION OF PREFERRED EMBODIMENT

Figure 1:
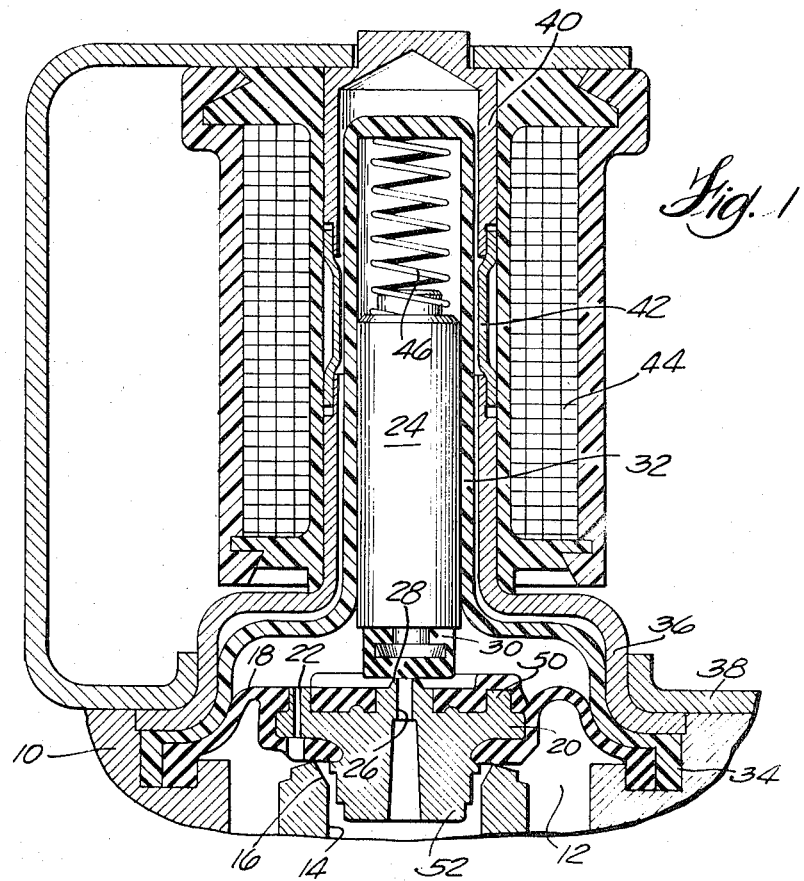
FIG. 1 is a vertical section through the pertinent portion of a solenoid-operated water valve incorporating the invention.

Valve body 10 is provided with an annular inlet 12 leading to outlet 14 separated by valve seat 16 against which the diaphragm 18 seats. The diaphragm is provided with an insert 20 which strengthens the central portion of the diaphragm. Bleed hole 22 in the rigid, plastic insert 20 permits water to flow to the upper side of the diaphragm and solenoid plunger 24 controls flow through the center orifice 26 in the insert 20. The insert includes a conical seat 28 against which the resilient tip 30 of plunger 24 seats. Since it is not necessary to accurately register the plunger relative to the orifice 26, greater clearance can be provided between the plunger and the plastic plunger guide tube 32. Bled hole Bleed can be molded to very accurate dimensions and cannot be distorted by high pressures or extreme flexure of the diaphragm 18.

Plunger 24 is guided in the thin wall, plastic tube 32, the lower end of which is belled to seat in the annular groove 34 in the valve body outside the diaphragm. The tube is held in sealing engagement with the diaphragm by the lower flux sleeve 36 and the seal thus obtained is superior to prior designs. The lower flux sleeve 36 is pressed into the generally U-shaped frame 38 which, in turn, is secured to the valve body. An upper flux sleeve 40 is pressed into the upper end of the frame 38 to surround the upper end of the plastic sleeve. The ends of the two flux sleeves are separated by the annular, non-magnetic, metallic sleeve 42 which enhances heat transfer and serves to reinforce the plastic tube 32. The flux sleeves 36, 40 serve as a magnetic flux path concentrating the magnetic flux from the coil 44 to the air gap between the ends of the flux sleeves and picking up the end of the magnetic, stainless steel plunger 24. When the coil is energized, the plunger will be lifted against the force of spring 46.

Figure 2:
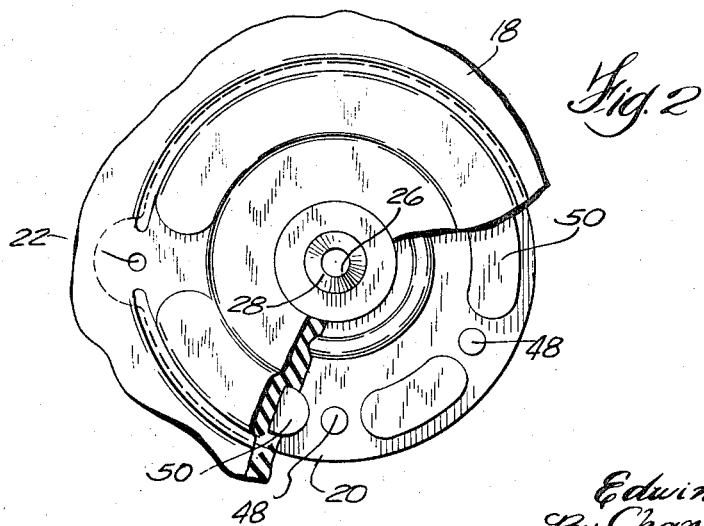
FIG. 2 is a meandering section on line 2—2 of FIG. 1.

As may be seen in FIG. 2, the insert itself has four holes 48 so that when the diaphragm is molded around the insert, the elastic compound will run through these holes and lock the insert relative to the diaphragm. The upper surface of the insert is provided with five raised bosses 50 which generally lie in a C configuration. When the diaphragm is molded around the insert, the elastic compound overlies these raised bosses, as may be seen in FIG. 1. This gives a C-shaped pad which engages the underside of the belled end of the tube 32 when the diaphragm is in the full open position. This spaces the diaphragm from the belled end and prevents blocking bleed hole 22 which, if blocked, would result in failure of the valve to close.

The insert shown includes the generally cylindrical boss 52 which extends into the outlet 14 past the tapered portion 16 of the outlet. Thus, as the diaphragm moves down, this cylindrical boss will enter the tapered section and finally will enter the straight portion of the outlet. This results in a throttling action greatly reducing or eliminating water hammer.

The construction permits a low cost assembly of great versatility in that the bleed hole size, central orifice, and depending boss can also be sized accurately to accommodate design variations. By molding the rubber around and through the insert, the resulting construction is of high reliability. The insert could be designed to snap into the diaphragm but this is not considered as satisfactory. Because the insert makes possible the raised conical seat for the plunger tip, greater clearance can be provided around the plunger to virtually eliminate the likelihood of the plunger hanging up in the open position. The single bleed hole of requisite size insures proper performance over a long, trouble-free, service life.

We claim:

1. A diaphragm-type, solenoid-operated valve comprising:
   a valve body having an annular inlet and an outlet centrally located relative to the inlet,
   a diaphragm mounted in the body overlying both the inlet and the outlet,
   a valve seat between the inlet and outlet,
   said diaphragm being adapted to close on said seat,
   a rigid insert molded in the diaphragm to be permanently locked therein and having a central orifice therethrough,
   a bleed hole in said insert allowing liquid flow from the inlet to the space above the diaphragm,
     the central orifice in said insert being larger than the bleed hole so that when the orifice is open liquid can flow from the space above the diaphragm faster than it can be replenished by flow through the bleed hole,
   a solenoid assembly including a watertight plunger guide and a coil,
   a plunger slidable in the plunger guide and actuated by energization of the coil,
     the end of the plunger having a resilient face closing on the central orifice in said insert and adapted to move from the central orifice when the coil is energized.

2. A valve according to claim 1 in which the insert has a raised conical seat surrounding the orifice facing the resilient tip of the plunger.

3. A valve according to claim 1 in which the plunger guide has a belled end facing the diaphragm to accommodate diaphragm flexure and the upper side of the diaphragm includes a raised boss preventing the bleed hole from seating on the belled end and being blocked off.

4. A valve according to claim 1 in which the insert is a rigid plastic having a depending cylindrical boss projecting into the outlet when the diaphragm is closed on said seat and acting to throttle the flow to the outlet as the diaphragm approaches said seat.

5. A valve according to claim 1 in which the rigid insert has holes therethrough through which the diaphragm material flows during molding the diaphragm on the insert so that the insert is positively fixed relative to the diaphragm.

* * * * *